April 29, 1969     W. HEGLER     3,440,822
PLASTIC PIPE
Filed June 8, 1966     Sheet 1 of 3
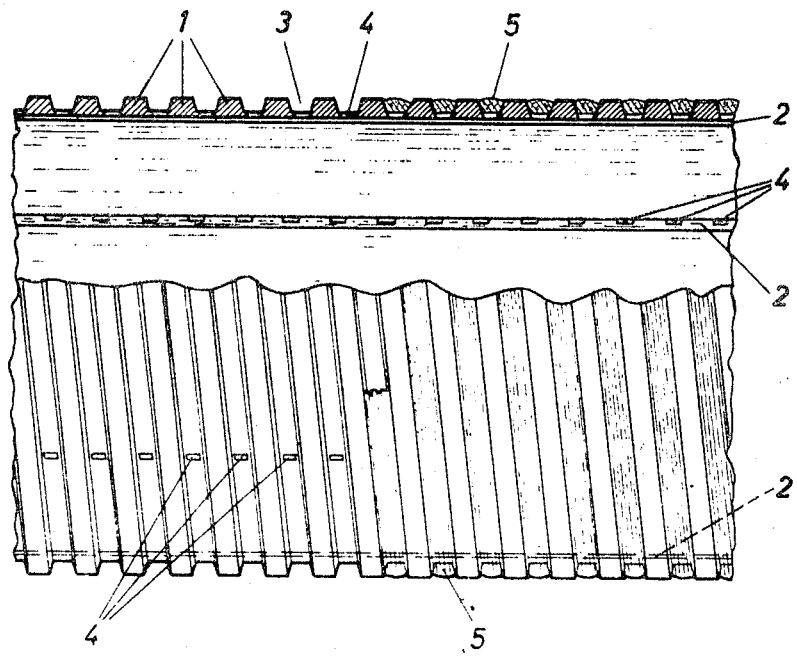
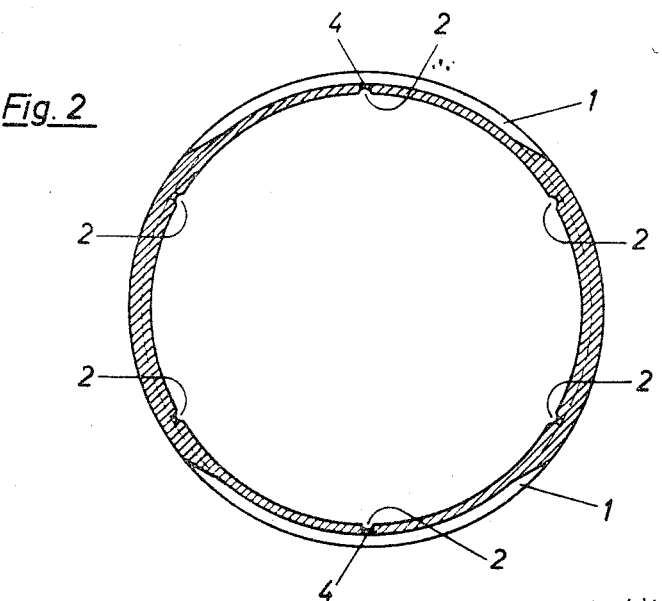
INVENTOR:
Wilhelm Hegler
By: Burgess, Dinklage & Sprung
Attorneys INVENTOR:
Wilhelm Hegler
By: Burges, Dinkley & Spring
Attorneys INVENTOR:
Wilhelm Hegler United States Patent Office 3,440,822
Patented Apr. 29, 1969

3,440,822
PLASTIC PIPE
Wilhelm Hegler, Goethestrasse 2,
Bad Kissingen, Germany
Filed June 8, 1966, Ser. No. 556,105
Claims priority, application Germany, June 23, 1965,
H 56,369
Int. Cl. F16l *11/04;* E01b *11/00*
U.S. Cl. 61—10                                                   8 Claims

ABSTRACT OF THE DISCLOSURE

Plastic pipe having a smooth inside wall and a ribbed reenforcing outside wall, wherein the inside wall is substantially straight in the longitudinal direction and has grooves on the inside surface in the longitudinal direction, and wherein apertures are provided between the grooves and the thin wall portions of the tube between reenforcing ribs.

---

This invention relates to plastic pipe. It more particularly refers to the production of plastic pipe which is particularly well suited to use as drain pipe for soil or similar drainage.

It is known to use plastic pipe for drainage purposes. One of the greatest advantages of plastic pipe, in this or other applications, is its flexibility and therefore its ability to be wound in substantially continuous lengths on large reels for transportation and from which the pipe can be directly laid. Plastic pipe to be used for drainage purposes must have a significant resistance to collapse by reason of the weight of earth on top of it or by reason of other ground pressures which build up around it. In order to provide support for the pipe and insure resistance to collapse by reason of the ground pressures set forth above, it has been the practice in the art to provide reinforcing ribs along the inside wall of the pipe.

This technique has been quite extensively used since it provides for reinforcement of the pipe walls while retaining a substantial portion of the flexibility of the plastic pipe. Unfortunately, it has been found that pipes having these reinforcing ribs are restrictive to the flow of fluid therethrough because the internal ribs impede this flow. Smooth wall pipes have an advantage over pipes having reinforcing ribs in that the velocity of flow therethrough is about 30 percent greater. Smooth pipes however have the disadvantage of having a lower resistance to collapse by reason of the force exerted thereon by the surrounding ground. Smooth pipes must therefore be made substantially thicker than reinforced pipes in order to withstand the ground pressure thereon. Although the thicker smooth pipes provide for greater throughput velocity than is available with equivalent size reinforced pipes, their flexibility is severely reduced and one of the advantages of plastic pipe, namely shipping and using of great lengths of pipe in coil form, is severely impaired if not lost completely.

It is therefore an object of this invention, to provide a plastic pipe having smooth pipe throughput velocity, reinforced pipe strength and sufficient flexibility to be shipped in coils.

Other and additional objects of this invention will become apparent from a consideration of this entire specification including the drawings and the claims appended hereto.

In accord with and fulfilling these objects, this invention includes, as one of its aspects, the provision of plastic pipe having reinforcing ribs and a smooth wall interior. The plastic pipe has substantially straight inside walls in the longitudinal direction, has longitudinal grooves in the inside walls, and has apertures between the ribs communicating with these grooves.

Understanding of this invention will be facilitated by reference to the accompanying drawing in which:

FIG. 1 is a front elevation partially in section of a pipe according to this invention;

FIG. 2 is a transverse section through a pipe made according to this invention;

Figure 3:
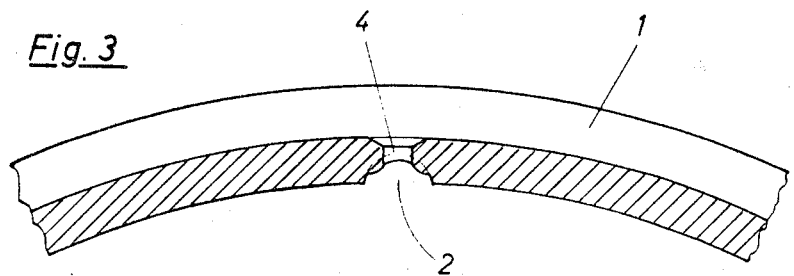
FIG. 3 is a partial transverse section of one type of pipe according to this invention.
Figure 4:
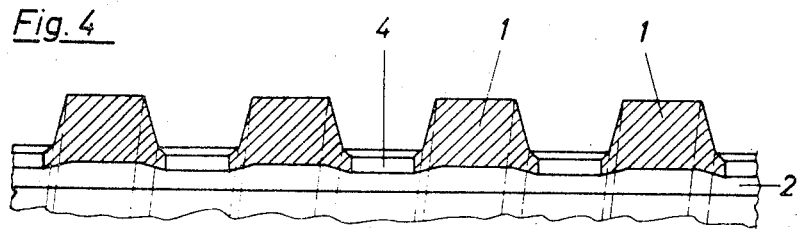
FIG. 4 is a longitudinal section through a portion of a pipe made according to this invention.
Figure 5:
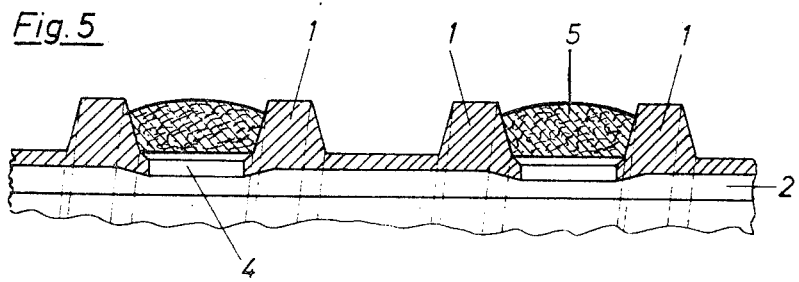
FIG. 5 is similar to FIG. 4 showing a modification thereof.

Referring now to the drawings, the drainpipe of FIGS. 1 to 4 is a drainpipe in which the external transverse ribs 1 form a double-threaded screw. On the inside of the pipe a plurality of longitudinal grooves 2 are provided, and at the points at which these longitudinal grooves 2 cross the valleys 3 between the transverse ribs, the water admission openings 4 are punched into the wall which is very thin at these points. In this embodiment, water admission openings are provided between all of the ribs. A filter 5 can be inserted between these ribs above the aperture, as represented in the right half of FIG. 1. FIG. 3 shows that, at the point where a water inlet opening 4 is located, the wall thickness is substantially slighter than at the other points between the reinforcing ribs. While in the case of the pipe of FIGS. 1 to 4, water inlet openings are located between every pair of ribs, in the emobdiment in FIG. 5 water inlet openings are provided only between alternate reinforcing ribs, and a filter cord 5 can be provided between such ribs covering said aperture.

Figure 6:
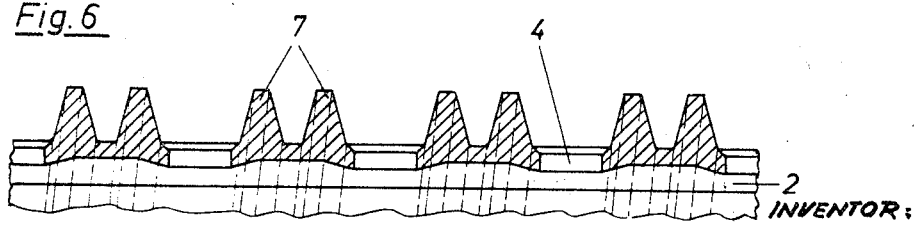
FIG. 6 is similar to FIGS. 4 and 5 showing a modified pipe according to this invention.

The higher the cross ribs are, the greater is the collapsing-pressure resistance of a pipe reinforced with cross ribs, for the same flexibility. In order to achieve a high collapsing-pressure resistance together with good flexibility and low material expenditure, the cross ribs can be constructed as double ribs, as shown in FIG. 6. In this case the water inlet openings are located between the ribs which are spaced more widely apart while providing no aperture between the ribs which are narrowly spaced apart.

Figure 7:
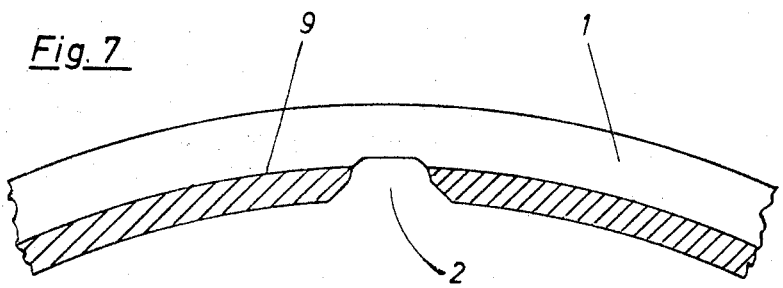
FIG. 7 is similar to FIG. 3 showing a modified access aperture arrangement.
Figure 8:
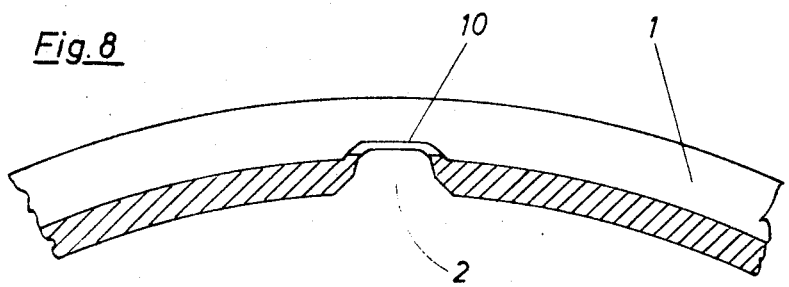
FIG. 8 is similar to FIG. 3 showing a modified access aperture arrangement.

As FIG. 7 shows, the longitudinal grooves 2 may also be so deep that they reach into the valley bottom 9 between reinforcing ribs, so that, at those points at which the longitudinal grooves intersect with the valley bottom, openings are produced, and it is not necessary afterwards to cut or punch openings into the pipe. This pipe form can be manufactured, however, only when no pressure difference between the interior of the pipe and the exterior is required in the manufacturing process, or when the longitudinal grooves are not provided until after the external formation of the pipe has been concluded. To avoid this difficulty, it is possible, as represented in the embodiment in FIG. 8, to provide an elevation 10 in the bottom of the valley between two cross ribs, at those points at which a groove 2 is located in the interior. By means of a tool guided in the threads, these elevations, as shown in FIG. 8, can be cut open, so that a narrow, slit-like water inlet opening is produced.

This invention has an unexpected advantage attached thereto. Plastic drainpipes, as previously manufactured, have had certain difficulties attached thereto. If the water admission apertures are large, silt gets into the pipe and builds up in the pipe thus causing a restriction in flow and eventually stoppage of water flow. On the other hand, if the water admission apertures are small, silting is reduced or even prevented; but deposits form on the walls of the aperture which increasingly restrict the already small opening and eventually block it closed completely. This latter phenomenon is particularly prevalent in iron bearing soils in which case such blockage is referred to an "ochering up." The tendency for small inlet aperture to be blocked, as set forth, has been found to be markedly reduced or prevented where the wall thickness of the pipe is reduced. Thus, in the situation where the wall thickness of the pipe surrounding the aperture is zero, that is, the circumference of the aperture is a line, the tendency to block is severely curtailed. It has been found that in the production of a pipe, designed according to this invention, it is practical to accomplish this zero-thickness aperture wall by providing the valleys between the reinforcing ribs with sloping or concave sides and by providing the longitudinal channel such that it is either a V-groove or so constructed that it crosses the rib valleys only at the very base thereof. This same result can be achieved in the situation where the water inlet apertures must be formed after the pipe walls are formed by providing on the outside of the pipe in the base of the rib valleys a raised portion which would cover the longitudinal channel formed in the inside wall of the pipe. After the pipe walls have been formed, this raised portion can be cut off thus exposing parts of the longitudinal channels and thereby forming water inlet openings.

The water inlet openings can be made in any desired shape, e.g. circular, ovate, rectilinear, free form, etc. It is preferred to provide a relatively long, relatively narrow slit as the inlet aperture since this structure tends to permit the entry of large quantities of water while keeping out at least larger particles of silt.

The plastic pipe according to this invention, may be manufactured of substantially any desired material such as vinyl resins, acrylonitrile-butadiene-styrene resins, polyacetal resins, synthetic or nautral rubber, polyethylene, polypropylene, etc.

What is claimed is:
1. A plastic pipe having relatively smooth and longitudinally straight interior walls, reinforcing ribs transversely disposed about the outside wall thereof, longitudinal grooves in the inside wall thereof, and water inlet openings disposed in the thin portions of the wall of the pipe between the ribs and in registry with said grooves.
2. A pipe as claimed in claim 1, wherein said inlet openings are slits.
3. A pipe as claimed in claim 1, wherein each of said openings is defined by a peripheral terminal edge of line thickness formed by a slanting surface in said thin wall portions.
4. A pipe as claimed in claim 1, wherein said reinforcing ribs are substantially helically disposed about the outer wall of said pipe.
5. A pipe as claimed in claim 1, wherein said apertures are disposed between each of said ribs.
6. A pipe as claimed in claim 1, wherein said reinforcing ribs are in the form of a double-threaded screw.
7. A pipe as claimed in claim 1, wherein a filter is disposed outwardly of each of said openings.
8. A pipe as claimed in claim 1, constructed of at least one member selected from the group consisting of vinyl resins, polyacetal resins, acrylonitrile-butadiene-styrene resins, polyethylene resins and polypropylene resins.

References Cited
UNITED STATES PATENTS

| | | | |
|---|---|---|---|
| 1,055,674 | 3/1913 | Smith | 61—11 |
| 2,763,991 | 9/1956 | Kennon | 61—13 |
| 2,798,768 | 7/1957 | Babin | 61—13 X |
| 2,810,264 | 10/1957 | Kelly | 61—11 |
| 3,103,789 | 9/1963 | McDuff et al. | 61—11 |
| 3,219,368 | 11/1965 | Crumpler | 61—13 X |

FOREIGN PATENTS

| | | |
|---|---|---|
| 1,306,138 | 9/1962 | France. |

EARL J. WITMER, *Primary Examiner.*